United States Patent

[11] 3,591,056

[72] Inventor Richard J. Griffin
 Denver, Colo.
[21] Appl. No 832,805
[22] Filed June 12, 1969
[45] Patented July 6, 1971
[73] Assignee Whale Inc.
 Nashville, Tenn.

[54] PIPETTING SYRINGE OF PRECISELY VARIABLE DISPLACEMENT VOLUME
 11 Claims, 6 Drawing Figs.

[52] U.S. Cl. .................................................. 222/309,
 222/340
[51] Int. Cl. ........................................ G01f 11/06
[50] Field of Search ............................ 222/340,
 309, 250, 43, 49; 128/234

[56] References Cited
 UNITED STATES PATENTS
1,512,060 10/1924 Schmucker ................... 222/309
3,013,435 12/1961 Rodrigues .................... 222/309 X
3,244,009 5/1966 Tietje et al .................... 222/309 X Primary Examiner—Evon C. Blunk
Assistant Examiner—H. S. Lane
Attorney—Cushman, Darby and Cushman ABSTRACT: A pipetting syringe of precisely variable displacement volume which includes a dispenser body having a plurality of holes for receiving and holding a removable stop pin in a selected one of the holes and wherein a fill plunger having a projection thereon for engagement with the stop pin is located within the body. An ejection plunger is slidably located within the body and within a longitudinal groove of the fill plunger for ejecting material from the syringe. The stop pin is placed in the desired hole which corresponds to the desired volume to be received and ejected by the syringe and the fill plunger is then pushed forwardly as far as possible and released so that a fill spring mounted within the body and in engagement with the ejection plunger forces the plungers rearwardly. The syringe is thus filled and the material is then ejected by independently pushing the ejection plunger forward.

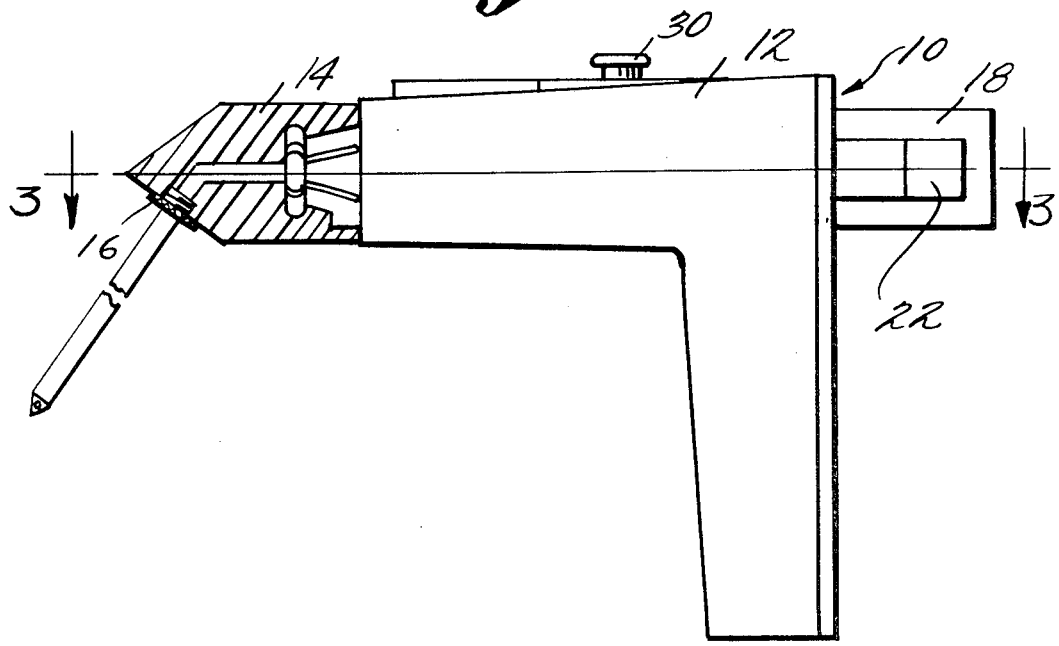
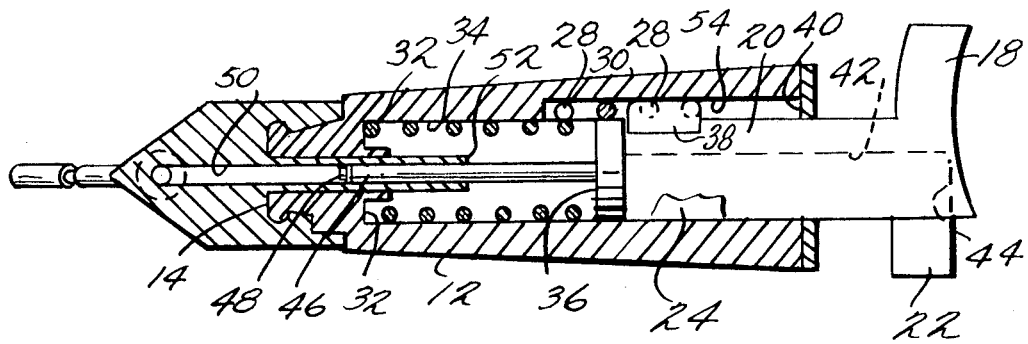

PATENTED JUL 6 1971 3,591,056

INVENTOR
RICHARD J. GRIFFIN

BY Cushman, Darby & Cushman
ATTORNEYS

PIPETTING SYRINGE OF PRECISELY VARIABLE DISPLACEMENT VOLUME

The present invention relates to a pipetting syringe and more particularly to a pipetting syringe with a precisely variable displacement volume for use within the clinical and industrial areas of the laboratory.

In the past, the use of such syringes in measuring precisely determined volumes of material has been difficult and has required the careful and often time-consuming measurement of the material in order to obtain the desired quantity in the syringe. Although such devices have served the purpose, they have not proved entirely satisfactory since it has not been possible to easily and quickly measure the exact amount of material required without the necessity of careful and close observation of the syringe when it is filled.

Accordingly, the general purpose of this invention is to provide a pipetting syringe of precisely variable displacement volume wherein the amount of material collected by the syringe may be precisely determined and wherein the filling of the syringe to the precise volume desired can be simply accomplished by merely pushing a fill plunger in the forward direction as far as it will go and then releasing the plunger. To accomplish this the present invention contemplates a unique syringe arrangement wherein a fill plunger and an ejection plunger are slidably located within the bore of a dispenser body and wherein the fill and ejection plungers are movable independently of one another.

An object of the present invention is the provision of a pipetting syringe which can be easily and quickly filled with material to a precisely determined volume.

Another object is to provide a pipetting syringe which includes an over travel feature with respect to the ejection plunger for greater efficiency and accuracy in the ejection of materials from the syringe.

A further object of the invention is the provision of a pipetting syringe having a threaded nozzle for accepting extensions of varied lengths.

Still another object is to provide a pipetting syringe wherein the ejection plunger includes a disposable tip whereby successive loads of material in the syringe are not contaminated by the preceding loads.

Other objects and features of the invention will become apparent to those of ordinary skill in the art as the disclosure is made in the following description of a preferred embodiment of the invention as illustrated in the accompanying sheets of drawings in which:

FIG. 1 is a side elevation of the apparatus;

FIG. 3 is a view in section of the device taken on the line 3—3 of FIG. 1 looking in the direction of the arrows;

Figure 2:
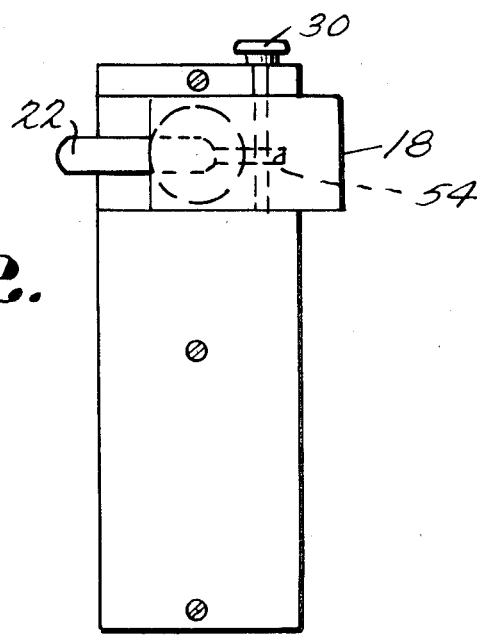
FIG. 2 is an end elevation of the apparatus shown in FIG. 1.

With reference now to the drawings, wherein like reference characters designate like or corresponding parts throughout the several views, there is shown in FIG. 1 (which illustrates a preferred embodiment) the syringe 10 which includes a dispenser body 12 which may include a nose piece or adapter 14. The adapter may be provided with a thread nozzle portion 16 for accepting extensions of varied configurations or lengths so that materials can be extracted from and ejected into containers and areas of various shapes and dimensions. The handle portion 18 of fill plunger 20 extends rearwardly of the body 12 as does the handle portion 22 of the ejection plunger 24.

Figure 4:
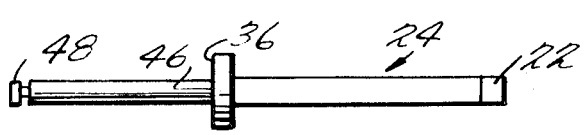
FIG. 4 is a side elevation view of the ejection plunger of the device.
Figure 5:
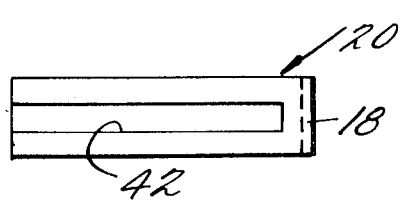
FIG. 5 is a side elevation view of the fill plunger.
Figure 6:
FIG. 6 is a side elevation view of the fill plunger looking at the side opposite from that illustrated in FIG. 5.

With reference now to FIGS. 2—6 it can be seen that the dispenser body 12 includes a plurality of holes 28 therein for receiving and holding a removable stop pin 30 in a selected one of the holes which corresponds to a precise volume of material which is to be taken by the syringe. The fill plunger together with fill spring 32 forms a first means at least partially located within the bore 34 of the dispenser body for enabling the filling of the syringe to a precisely determined volume. The fill spring is mounted within the bore and at the forward portion thereof in engagement with the body and with the ejection plunger at an enlarged projecting area 36 thereof.

The fill plunger 20 includes a projection 38 for engagement with the stop pin 30 and with the rearward portion 40 of the dispenser body, respectively, upon the filling of the syringe. The fill plunger also includes a longitudinal groove 42 therein in which the ejection plunger is slidably located, and the fill plunger also includes a shoulder portion 44 adjacent to the groove for contacting the rearward portion of the ejection plunger and for enabling the simultaneous forward movement of the ejection plunger with the forward movement of the fill plunger.

The ejection plunger 24 includes an extended portion 46 which is adapted to receive by conventionally known fastening means a disposable pipette tip 48 of, for example, polypropylene whereby succeeding loads of material which are drawn into the syringe are not contaminated by the pipette tip from previous loads.

In the operation of the syringe, the precise amount of material desired to be drawn into the syringe for later ejection therefrom is determined and the stop pin 30 is placed into the appropriate one of the holes 28 of the dispenser body 12. Because of the action of the fill spring 32, the fill plunger 20 and the ejection plunger 24 are normally located at the rearward portion of the bore 34 with the projection 38 in contact with the rearward portion 40 of the body. With the pin 30 in the proper hole, the handle 18 of the fill plunger is then pushed forward by the operator until the projection 38 comes into contact with the stop pin and the forward movement of the fill plunger and of the ejection plunger is stopped. The handle 18 is then released by the operator and the action of the fill spring 32 again forces the fill plunger and the ejection plunger towards the rearward portion of the body and in the process causes the filling of the bore of the syringe with the desired material. Because the forward movement of the fill and ejection plungers was controlled by the positioning of the stop pin 30, the amount of material which is taken into the syringe is controlled precisely and it can be seen that the farther forward the stop pin 30 is placed in the holes 28 the greater the amount of material will be which is admitted to the syringe.

After the syringe has been filled to the desired precise amount, the material may be ejected by merely independently moving the ejection plunger 24 in the forward direction by means of the handle 22. The forward movement by the operator will overcome the force of the fill spring 32 and will cause the material located within the section 50 of the dispenser body to be pushed outwardly from the syringe and ahead of the disposable pipette tip 48. The extended portion 46 of the ejection plunger 24 is of such a dimension that when the ejection plunger is pushed forwardly as far as possible and into contact with the shoulder 52 the end of the ejection plunger and the pipette tip will extend beyond the aperture 50. This overtravel feature provides for greater efficiency and accuracy of ejection of the materials from the syringe and insures that substantially all of the material is ejected and that none of the material is retained in the syringe.

Prior to the filling of the syringe and when the fill plunger is being pushed forward together with the ejection plunger, the projection 38 moves in the groove 54 which is located within the body 12. Likewise, when the material is to be ejected from the syringe the ejection plunger is moved forwardly away from the shoulder 44 of the fill plunger and in sliding engagement with the groove 42 of the fill plunger.

Thus, the present invention provides for a unique pipetting syringe which provides for the quick, easy and precise measurement of variable volumes of material. The syringe of this invention also provides for an overtravel feature of the ejection plunger which provides for greater efficiency and accuracy in the ejection of materials from the syringe. This syringe obviates the necessity of carefully supervised and time consuming measurement of materials and enables the precise measurement of quantities of material by merely inserting a stop pin into a predetermined hole, pushing the fill and ejection plungers forward as far as they will go, releasing the plungers so that the syringe is filled, and then ejecting the material when desired by merely independently pushing the ejection plunger as far forward as it will go. This can be done quickly and easily without the slow and careful concentration of the operator as has been heretofore necessary with prior art syringes.

Obviously many modifications and variations of the present invention are possible in light of the above teachings. It is therefore to be understood that within the scope of the appended claims, the invention may be practiced otherwise than as specifically described.

What I claim is:

1. A pipetting syringe of precisely variable displacement volume, comprising:
   a dispenser body with an axial bore therethrough;
   said body also having a plurality of holes therein for receiving and holding a removable stop pin in a selected one of said holes; a fill plunger at least partially and slidably located within said bore and including a longitudinal groove therein, said fill plunger having a projection for engagement with said stop pin and with the rearward portion of said body, respectively, upon the filling of said syringe;
   an ejection plunger slidably carried within said bore and within the longitudinal groove of said fill plunger for ejecting material from said syringe; and
   a fill spring mounted within said bore and at the forward portion of said body for engagement with said body and with said ejection plunger for causing the rearward movement of said fill and ejection plungers when the syringe is being filled.

2. A syringe as in claim 1 wherein said fill plunger further includes a shoulder portion adjacent to said groove for contacting the rearward portion of said ejection plunger and for enabling the simultaneous forward movement of said ejection plunger with the forward movement of said fill plunger.

3. A pipetting syringe of precisely variable displacement volume, comprising:
   a dispenser body with an axial bore therethrough;
   said body also having a plurality of holes therein for receiving and holding a removable stop pin in a selected one of said holes;
   first means at least partially located within said bore for enabling a filling of said syringe to a precisely determined volume; and
   second means in slidable contact with at least a portion of said first means and at least partially within said bore for ejecting material from said syringe whereby said precise volume of material is substantially completely ejected.

4. The syringe of claim 3 wherein said first means includes:
   a fill plunger having an elongated groove therein and including a projection at the forward end thereof for engagement with said stop pin and with the rearward portion of said body, respectively, upon the filling of said syringe.

5. The syringe of claim 4 wherein said first means further includes a fill spring mounted within said bore and at the forward portion of said body in engagement with said body and with said second means for causing the rearward movement of said fill plunger and said second means when the syringe is being filled.

6. The syringe of claim 3 wherein a portion of said first means has a longitudinal groove therein and wherein said second means includes:
   an ejection plunger slidably located within said bore and within the longitudinal groove for ejecting material from the syringe.

7. The syringe of claim 6 wherein said second means further includes a dispensable pipette tip removably fastened to the forward end of said ejection plunger whereby succeeding loads of material drawn into the syringe are not contaminated by previous loads.

8. The syringe of claim 6 wherein said ejection plunger is of such a length as to extend beyond the forwardmost portion of said body when the ejection plunger is pushed forward to eject the material, whereby overtravel of said ejection plunger with respect to said body occurs.

9. The syringe of claim 6 wherein said ejection plunger includes an enlarged projecting area substantially midway along the length of said ejection plunger;
   said first means including a fill plunger within said bore and a fill spring mounted within said bore and at the forward end of said body in engagement with said body and with said enlarged projecting area for causing the rearward movement of said ejection plunger; and
   said enlarged projecting area also being in removable contact with said fill plunger whereby said enlarged projecting area is removed from contact with said fill plunger when said ejection plunger is moved forwardly independently of any movement of said fill plunger to cause the substantially complete ejection of the material from the syringe.

10. The syringe of claim 6 including a fill plunger located within said bore with a handle portion integral therewith; and
    wherein said ejection plunger includes a separate handle integral with said ejection plunger;
    whereby said syringe may be filled by first pushing said fill plunger forward by the handle thereof and whereby said syringe may be substantially completely emptied by later independently pushing said ejection plunger forward by the handle integral with said ejection plunger.

11. The syringe of claim 6 wherein said ejection plunger is of such a length as to extend beyond the forwardmost portion of said body when the ejection plunger is pushed forward to eject the material, whereby overtravel of said ejection plunger with respect to said body occurs.